United States Patent [19]

Kurisu et al.

[11] Patent Number: 4,799,836
[45] Date of Patent: Jan. 24, 1989

[54] METHOD AND APPARATUS FOR MACHINING THE SIDE EDGE SURFACE OF A WEB PLATE

[75] Inventors: Shingo Kurisu; Shunji Omori; Hiroyuki Takenaka; Tsuneo Egawa, all of Hiroshima; Takuro Mitsunaga; Nobuo Kiyama, both of Mihara, all of Japan

[73] Assignee: Mitsubishi Jukogyo Kabushiki Kaisha, Tokyo, Japan

[21] Appl. No.: 66,736

[22] Filed: Jun. 25, 1987

Related U.S. Application Data

[62] Division of Ser. No. 643,309, Aug. 22, 1984, Pat. No. 4,733,998.

[30] Foreign Application Priority Data

Oct. 24, 1983 [JP] Japan .................. 58-197577

[51] Int. Cl.$^4$ .............................. B23C 3/12
[52] U.S. Cl. .................... 409/138; 409/131; 409/140
[58] Field of Search ............. 409/131, 132, 138, 139, 409/140, 201, 204, 216, 228, 229, 234

[56] References Cited

U.S. PATENT DOCUMENTS

| | | | |
|---|---|---|---|
| 2,191,559 | 2/1940 | Drummond | 409/132 |
| 2,200,544 | 5/1940 | Drummond | 409/132 |
| 2,206,770 | 7/1940 | Drummond | 409/131 |
| 3,117,477 | 1/1964 | Cardell | 409/138 |
| 3,377,896 | 4/1968 | DeCorta | 409/138 |
| 3,599,531 | 8/1971 | Wright et al. | 409/138 |
| 3,977,298 | 8/1976 | Linsinger | 409/138 |
| 4,177,699 | 12/1979 | Dovnar et al. r | 409/132 X |

FOREIGN PATENT DOCUMENTS

1492932 11/1973 United Kingdom .

*Primary Examiner*—Gil Weidenfeld
*Assistant Examiner*—Steven C. Bishop
*Attorney, Agent, or Firm*—Wenderoth, Lind & Ponack

[57] ABSTRACT

A side edge surface of a web plate is trimmed by or machined after feeding a milling cutter into the side edge surface of the web plate, which cutter has on its outer peripheral surface cutting edges at a predetermined angle with respect to its rotary axis, and driving the milling cutter in rotation. The rotary axis of the milling cutter is a plane which is kept parallel to a desired machined surface of the side edge surface of the web plate, and the angle formed between the cutting edge of the milling cutter and the side edge surface of the web plate is limited to within 55 degrees to 125 degrees.

9 Claims, 2 Drawing Sheets

U.S. Patent   Jan. 24, 1989   Sheet 1 of 2   4,799,836

METHOD AND APPARATUS FOR MACHINING THE SIDE EDGE SURFACE OF A WEB PLATE

This is a division of application Ser. No. 643,309, filed Aug. 22, 1984, now U.S. Pat. No. 4,733,998.

The present invention relates to a method for side-trimming a web plate by means of a cutter, which contemplates increase of the life of the tool and improvement in the precision of a machined surface.

Figure 1:
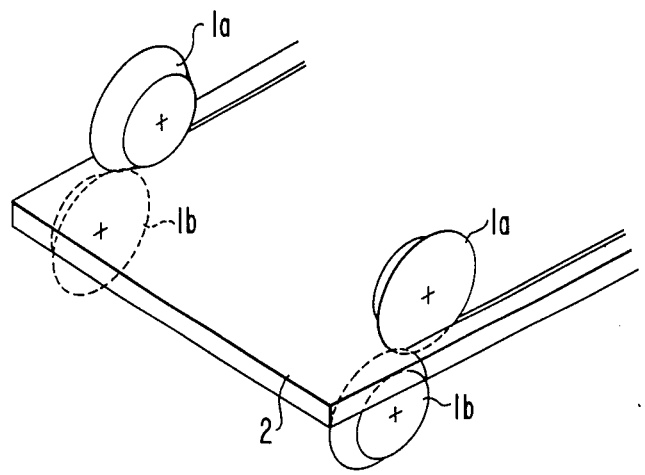

In a web processing installation such as a steel plate rolling line or the like, there is provided a trimming step for cutting opposite side edge portions of a web plate in order to make the width of the web plate constant. Heretofore, among those known as side trimmers for cutting the opposite side edge portions of such web plate, a structure as shown in FIG. 1 exists, in which a web plate 2 is pinched by a pair of circle cutters 1a and 1b so as to cut the web plate. In this side-trimmer making use of the circle cutters 1a and 1b, the cutting edges of the circle cutters 1a and 1b in the shearing portions would be opened in the widthwise direction due to shearing forces, and even if a rigidity of the circle cutters 1a and 1b is enhanced, a cutting margin of at least 1 millimeter to 2 millimeters or more is necessary in the case where the web plate 2 is a hot rolled steel plate, which becomes one of the causes for bringing about lowering of a yield.

Hence, a side-trimmer relying upon cutting by means of a milling cutter has been proposed (reference should be made to, for instance, Japanese Patent Publication No. 58-34245), and thereby it has become possible to set the cutting margin at a very small value. However, since a traveling speed of the web plate 2 is as high as 100 m/min. to 400 m/min. and also the thickness of the web plate 2 is as thin as about 3 millimeters in average, burrs would arise on the machined surface and the milling cutter would be worn in a short period of time, so that the proposed side-trimmer was poor in practicability.

It is therefore an object of the present invention to provide a novel method for trimming, in which the shortcomings of the above-mentioned side-trimmer in the prior art relying upon cutting by making use of a milling cutter are eliminated, and which contemplates improvement in the precision of a machined surface and increase of the life of a tool.

According to one feature of the present invention, there is provided a method for side-trimming a web plate, in which a side edge surface of the web plate is machined by feeding a cutter into the side edge surface of the web plate, which cutter has on its outer peripheral surface, cutting edges at a predetermined angle with respect to its rotary axis, with the rotary axis of the cutter inclined so that the angle formed between the cutting edge of the cutter and the side edge surface of the web plate may fall within the range of 55 degrees to 125 degrees, while the rotary axis of the milling cutter is inclined in a plane which is either parallel to a desired machined surface of the side edge surface of the web plate, or perpendicular to the upper or lower surface of said web plate, and driving the cutter in rotation.

Therefore, according to the present invention, since the rotary axis of the cutter is inclined while being kept parallel to a desired machined surface of the edge surface of the web plate, the side edge surface of the web plate can be cut by means of the entire width of the cutting edges, and hence it is possible to make the cutting load uniform and also to prolong the life of a tool. In addition, since the cutting edge is disposed so as to be nearly at right angles to the direction of travel of the web plate, burrs would not generated on the cut surface, but even if burrs should be generated they would be very few, and moreover, owing to the fact that the cutting is effected in the directon of travel of the web plate in which direction the rigidity of the web plate is highest, flexure of the web plate is almost not present, so that improvement in the precision of a machined surface can be contemplated and also there is no fear of damaging a tool due to frictional vibration.

Figure 2:
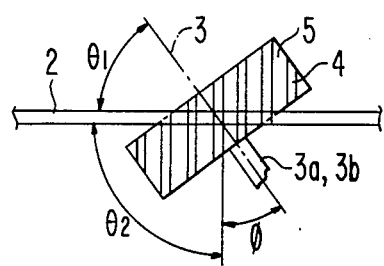
Figure 3:
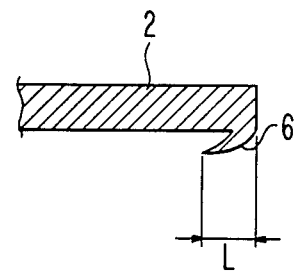
Figure 4:
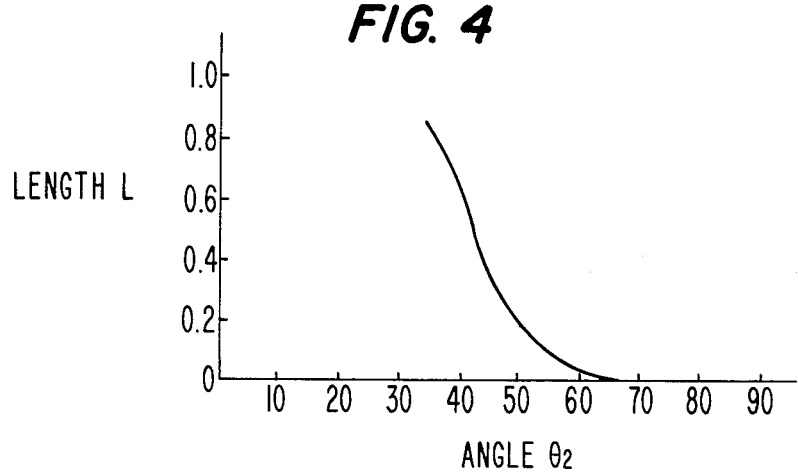
Figure 5:
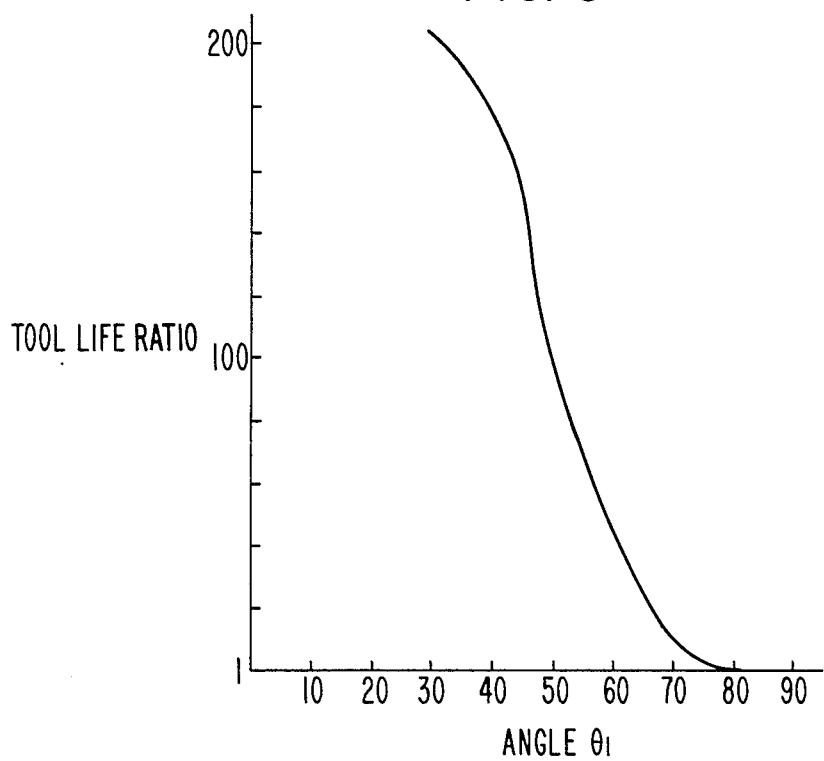
Figure 6:
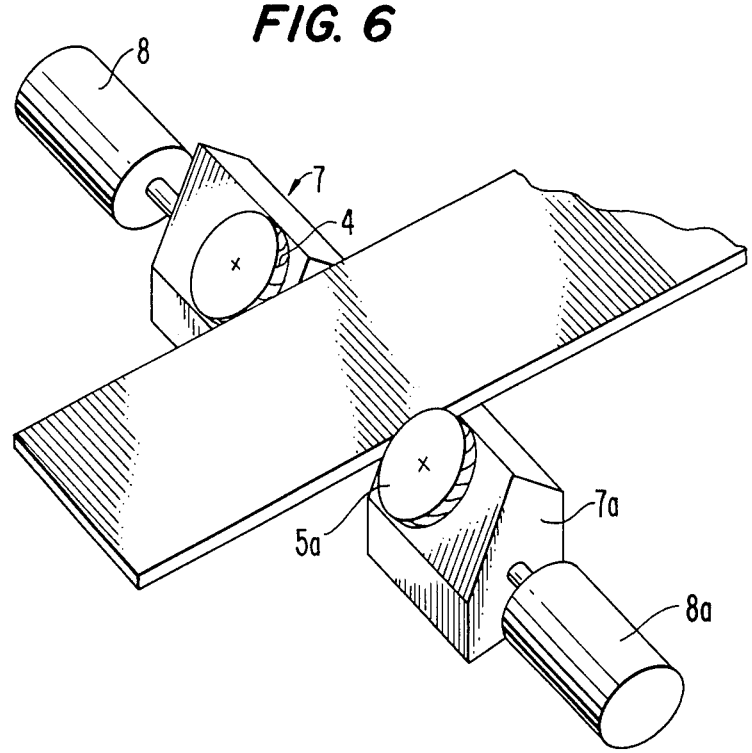

The above-mentioned and other objects, features and advantages of the present invention will become more apparent by reference to the following description of a preferred embodiment of the present invention taken in conjunction with the accompanying drawings, wherein:

FIG. 1 is a schematic perspective view showing an operation principle of a side-trimmer in the prior art, FIG. 2 is a schematic side view showing an operation principle in a method for side-trimming a web plate according to the present invention, FIG. 3 is a cross-section view of one side edge portion of a trimmed web plate, FIG. 4 is a diagram showing the relation of an angle formed between a web plate and a cutting edge versus a length of a burr, FIG. 5 is a diagram showing the relation of an angle formed between a rotary axis of a cutter and a web plate versus a tool life ratio; and FIG. 6 shows a side-trimmer of the present invention.

Now the operation principle in the method of side-trimming a web plate according to the present invention will be described with reference to FIG. 2. A cutter 5 having its cutting edges 4 on the outer peripheral surface at an angle $\phi$ with respect to an axis 3 of a rotary shaft which is attached to means for feeding and means for rotating a cutter 5 such as, for example, a twisted-edge cylindrical plain milling cutter or the like is employed, and the cutter 5 is set by means attached to the rotary shaft for orienting the cutter 5 in such manner that the axis 3 of the cutter 5 is inclined by an angle $\theta_1$ with respect to a web plate 2 and an angle $\theta_2$ lying in a plane containing the longitudinally extending side edge surface of the web plate and formed between the cutting edge 4 and the web plate 2 may fall within the range of $55° \leq \theta_2 \leq 125°$. The reason for such limitation is as follows. That is, if the angle $\theta_2$ is made too small or too large, then a burr 6 will be generated at the edge portion of the web plate 2 having an upper and lower surface as shown in FIG. 3 which shows a cross-section configuration of a machined portion of the web plate 2, and as seen in FIG. 4 which shows a relation of a length L of the burr 6 versus the angle $\theta_2$, the length L of the burr 6 can be deemed to be nearly zero within the range of $55° \leq \theta_2 \leq 90°$. It has been also confirmed that this small value of the length L is quite equally realized in the range of $90° \leq \theta_2 \leq 125°$. It is to be noted that these data are the values obtained in the case where a web plate 2 of 2.6 millimeters in thickness was conveyed by suitable means at a speed of 400 m/min. and cut at a cutting speed of 200 m/min. with the axis 3 of the cutter 5 inclined by an angle $\theta_1$ of 45 degrees, and a cutting depth was set at 3 millimeters.

On the other hand, the relation of a tool life ratio taking a value 1 in the case of setting the angle $\theta_1$ at 90 degrees versus the angle $\theta_1$ is shown in FIG. 5. However, these data are the values obtained in the case where the above-described web plate 2 of 2.6 millimeters in thickness was conveyed at a speed of 400 m/min., a cutting speed of the cutter 5 whose angle $\theta_2$ was set at 90 degrees, was set at 200 m/min., and the cutting depth was set at 5 millimeters. As will be obvious from this diagram, a life of the cutter 5 can be prolonged by setting the angle $\theta_1$ in the range of $\theta_1 \leq 70°$. According to the present invention, as will be apparent from FIG. 2, since the cutting edge 4 has a cutting speed component in its lengthwise direction (in the vertical direction as viewed in FIG. 2), a substantial rake angle of the cutting edge 4 becomes larger than the original rake angle of the cutter 5, resulting in that generation of the burrs 6 is reduced, also a cutting force is decreased and the large rake angle serves more advantageously in view of the life of a tool. It is to be noted that if the angle $\theta_1$ is chosen to be 5 degrees or less, then the width of the cutting edge 4 must be set very long and practical use thereof becomes difficult, and therefore, the lower limit of the angle $\theta_1$ should be preferably set at about 5 degrees. In addition, the cutter 5 may be reciprocated by means adapted for moving the cutter 5 in the direction parallel to the axis 3 during the machining or when machining is not effected, then the width of the cutting edges 4 is used further effectively, and so, such mode of operation is more advantageous in view of the life of a cutter 5.

Thus, the apparatus of the present invention can be used for machining opposite longitudinally extending side edge surfaces of a web plate, and comprises a first rotary cutter 5 having a rotary axis and cutting edges 4 on a radially outer peripheral surface thereof which are at a predetermined angle with respect to the rotary axis of the first rotary cutter, a first rotary shaft 3a (shown in FIG. 3) fixedly attached to the first rotary cutter for rotating the first rotary cutter about the rotary axis thereof, first support means 7 rotatably supporting the first rotary shaft, for feeding the first rotary cutter toward one of the longitudinally extending side edge surfaces and for orienting the first rotary cutter with the rotary axis thereof inclined at a first angle with respect to the one longitudinally extending side edge surface of the web plate such that a second angle is formed between the cutting edges and the longitudinal corner edge of the one longitudinally extending side edge surface of the web plate to be machined, the second angle lying in a plane containing the one longitudinally extending side edge surface and being within the range of 55 degrees to 125 degrees, first drive means 8 connected to the first rotary shaft for rotating the first rotary shaft, a second rotary cutter 5a having a rotary axis and cutting edges on a radially outer peripheral surface thereof which are at a predetermined angle with respect to the rotary axis of the second rotary cutter, a second rotary shaft 3b fixedly attached to the second rotary cutter for rotating the second rotary cutter about the rotary axis of the second rotary cutter, second support means 7a rotatably supporting the second rotary shaft, for feeding the second rotary cutter toward the other of the longitudinally extending side edge surfaces and for orienting the second rotary cutter with the rotary axis of the second rotary cutter inclined at a first angle with respect to the other longitudinally extending side edge surface of the web plate such that a second angle is formed between the cutting edges of the second rotary cutter and the longitudinal corner edge of the other longitudinally extending side edge surface of the web plate to be machined, the second angle lying in a plane containing the other longitudinally extending side edge surface and being within the range of 55 degrees to 125 degrees; and second drive means 8a connected to the second rotary shaft for rotating the second rotary shaft, whereby when the web plate is moved into contact with both the radially outer peripheral surfaces of the first and second rotary cutters and the web plate is moved past the first and second rotary cutters the tool life of the first and second rotary cutters is greatly improved due to more effective use of the cutting edges of the first and second rotary cutters. Also, the apparatus further includes means incorporated in the means 7 for moving the first rotary cutter in a direction parallel to the rotary axis of the first rotary cutter and means (incorporated in the means 7a) for moving the second rotary cutter in a direction parallel to the rotary axis of the second rotary cutter.

While a principle of the present invention has been described above in connection to one preferred embodiment of the invention, it is a matter of course that many changes and modifications can be made to the illustrated embodiment without departing from the spirit of the present invention.

What is claimed is:

1. Apparatus for machining at least one longitudinally extending side edge surface of a web plate comprising,
    at least one cylindrical rotary cutter having a rotary axis and cutting edges on a radially outer peripheral surface of said cylindrical rotary cutter which are at a predetermined angle greater than 0 degrees with respect to the rotary axis of said cylindrical rotary cutter;
    a rotary shaft fixedly attached to said cylindrical rotary cutter along said rotary axis;
    means on which said rotary shaft is mounted for orienting said cylindrical rotary cutter with said rotary axis of said cylindrical rotary cutter inclined at a first angle other than 90 degrees with respect to said side edge of said web plate such that a second angle is formed between the cutting edges and the longitudinal corner edge of the longitudinally extending side edge surface of said web plate to be machined, said second angle lying in a plane containing said longitudinally extending side edge surface and being within the range of 55 degrees to 125 degrees, and for feeding said cylindrical rotary cutter toward the edge of the web plate;
    means connected to said rotary shaft for rotating said shaft, whereby when the web plate is moved into contact with said radially outer peripheral surface of said cylindrical rotary cutter and past said cylindrical rotary cutter the side edge surface of the web plate can be machined by the cylindrical rotary cutter, the cylindrical rotary cutter having improved tool life due to more effective use of the cutting edges on the cylindrical rotary cutter.

2. The apparatus of claim 1, further comprising means for moving said cylindrical rotary cutter in a direction parallel to said rotary axis of said cylindrical rotary cutter.

3. The apparatus of claim 1, wherein said predetermined angle between said cutting edges and said rotary axis of said cylindrical rotary cutter is in the range of 5-70 degrees.

4. Apparatus for machining opposite longitudinally extending side edge surfaces of a web plate, comprising:
    a first rotary cutter having a rotary axis and cutting edges on a radially outer peripheral surface of said first rotary cutter which are at a predetermined angle greater than 0 degrees with respect to said rotary axis of said first rotary cutter;

a first rotary shaft fixedly attached to said first rotary cutter for rotating said first rotary cutter about said rotary axis;

first support means rotatably supporting said first rotary shaft, feeding said first rotary cutter toward one of said longitudinally extending side edge surfaces and for orienting said first rotary cutter with said rotary axis of said first rotary cutter inclined at a first angle other than 90 degrees with respect to said one of said longitudinally extending said edge surfaces of said web plate such that a second angle is formed between said cutting edges and the longitudinal corner edge of said one of said longitudinally extending side edge surfaces of said web plate to be machined, said second angle lying in plane containing said one of said longitudinally extending side edge surfaces and being within the range of 55 degrees to 125 degrees;

first drive means connected to said first rotary shaft for rotating said first rotary shaft;

a second rotary cutter having a rotary axis and cutting edges on a radially outer peripheral surface of said second rotary cutter which are at a predetermined angle greater than 0 degrees with respect to said rotary axis of said second rotary cutter;

a second rotary shaft fixedly attached to said second rotary cutter for rotating said second rotary cutter about said rotary axis of said second rotary cutter;

second support means rotatably supporting said second rotary shaft, feeding said second rotary cutter toward the other one of said longitudinally extending side edge surfaces and for orienting said second rotary cutter with said rotary axis of said second rotary cutter inclined at a first angle other than 90 degrees with respect to said other one of said longitudinally extending side edge surfaces of said web plate such that a second angle is formed between said cutting edges of said second rotary cutter and the longitudinal corner edge of said other one of said longitudinally extending side edge surfaces of said web plate to be machined, said second angle lying in a plane containing said other one of said longitudinally extending side edge surfaces and being within the range of 55 degrees to 125 degrees; and second drive means connected to said second rotary shaft for rotating said second rotary shaft, whereby when said web plate is moved into contact with both said radially outer peripheral surfaces of said first and second rotary cutters and said web plate is moved past said first and second rotary cutters the tool life of said first and second rotary cutters is greatly improved due to more effective use of said cutting edges of said first and second rotary cutters.

5. The apparatus of claim 4, further comprising means for moving said first rotary cutter in a direction parallel to said rotary axis of said first rotary cutter and means for moving said second rotary cutter in a direction parallel to said rotary axis of said second rotary cutter.

6. The apparatus of claim 4, wherein said predetermined angle between said cutting edges of said first rotary cutter and said rotary axis of said first rotary cutter is in the range of 5–70 degrees and said predetermined angle between said cutting edges of said second rotary cutter and said rotary axis of said second rotary cutter is in the range of 5–70 degrees.

7. Apparatus for machining at least one longitudinally extending side edge surface of a web plate, comprising:

at least one cylindrical rotary cutter having a rotary axis and cutting edges on a radially outer peripheral surface of said cylindrical rotary cutter which are at a predetermined angle greater than 0 degrees with respect to the rotary axis of said cylindrical rotary cutter;

a rotary shaft fixedly attached to said cylindrical rotary cutter along said rotary axis;

means for changing a point of contact between each of said cutting edges of said milling cutter and a side edge surface of a web plate by orienting said cutter with respect to said web plate so that the point of contact moves axially with respect to said rotary axis of said milling cutter during machining of the side edge surface of the web plate, said means for orienting said cylindrical rotary cutter rotatably supporting said rotary shaft with said rotary axis of said cylindrical rotary cutter inclined at a first angle other than 90 degrees with respect to said side edge of said web plate such that a second angle is formed between the cutting edges and the longitudinal corner edge of the longitudinally extending side edge surface of said web plate to be machined, said second angle lying in a plane containing said longitudinally extending side edge surface and being within the range of 55 degrees to 125 degrees;

means connected to said rotary shaft for rotating said shaft, whereby when the web plate is moved into contact with said radially outer peripheral surface of said cylindrical rotary cutter and past said cylindrical rotary cutter the side edge surface of the web plate can be machined by the cylindrical rotary cutter, the cylindrical rotary cutter having improved tool life due to move effective use of the cutting edges on the cylindrical rotary cutter.

8. The apparatus of claim 7, further comprising means for moving said cylindrical rotary cutter in a direction parallel to said rotary axis of said cylindrical rotary cutter and means for feeding said cylindrical rotary cutter toward the edge of the web plate.

9. The apparatus of claim 7, wherein said orienting means changes the point of contact between the cutting edge and the side edge surface such that the entire width of the cutting edges of the cutter machines the side edge surface of the web plate.

* * * * *